US008235081B2

(12) United States Patent
Delgado et al.

(10) Patent No.: US 8,235,081 B2
(45) Date of Patent: Aug. 7, 2012

(54) IN-LINE PUMPING ASSEMBLY FOR SELF-INFLATING TIRE

(75) Inventors: Andres Ignacio Delgado, Medina, OH (US); Christopher David Dyrlund, Canton, OH (US); Mark Anthony Sieverding, Uniontown, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 40 days.

(21) Appl. No.: 12/951,168

(22) Filed: Nov. 22, 2010

(65) Prior Publication Data

US 2012/0125504 A1    May 24, 2012

(51) Int. Cl.
    *B60C 23/12* (2006.01)
(52) U.S. Cl. .................... 152/419; 152/415; 152/425
(58) Field of Classification Search .............. 152/415, 152/419, 423, 424, 425, 426
See application file for complete search history.

(56) References Cited

U.S. PATENT DOCUMENTS

| 638,628 | A | 12/1899 | Everett et al. | |
|---|---|---|---|---|
| 1,050,886 | A | 1/1913 | Wetherell | |
| 1,134,361 | A | 4/1915 | Wetherell | |
| 2,908,313 | A | 10/1959 | Pfeiffer | 152/429 |
| 3,304,981 | A | 2/1967 | Sheppard | 152/426 |
| 3,833,041 | A | 9/1974 | Glad et al. | 152/347 |
| 4,373,567 | A | 2/1983 | Declercq | 152/405 |
| 4,922,984 | A | 5/1990 | Dosjoub et al. | 152/415 |
| 5,052,456 | A | 10/1991 | Dosjoub | 152/415 |
| 7,117,731 | B2 | 10/2006 | Hrabal | 73/146 |
| 7,225,845 | B2 | 6/2007 | Ellmann | 152/426 |
| 8,042,586 | B2 * | 10/2011 | Losey et al. | 152/426 |
| 8,113,254 | B2 * | 2/2012 | Benedict | 152/426 |
| 2006/0283534 | A1 | 12/2006 | Hawes | 152/415 |
| 2009/0044891 | A1 | 2/2009 | Lee | 152/416 |
| 2010/0243121 | A1 | 9/2010 | Elgenbrode | 152/419 |

FOREIGN PATENT DOCUMENTS

| CN | 1111575 | 11/1995 |
|---|---|---|
| DE | 3433318 | 9/1984 |
| DE | 3881591 | 1/1989 |
| DE | 9000314 | 1/1990 |
| RU | 2106978 | 3/1998 |
| WO | 03/049958 | 6/2003 |
| WO | 2005/012009 | 2/2005 |
| WO | 2007/134556 | 11/2007 |
| WO | 2010/008338 | 1/2010 |
| WO | 2010/110905 | 9/2010 |

* cited by examiner

*Primary Examiner* — Kip T Kotter
(74) *Attorney, Agent, or Firm* — Richard B. O'Planick (57) ABSTRACT

A tire for a self-inflating tire system includes a tire carcass having an annular air tube-receiving groove formed within a tire carcass wall and a pump assembly within the groove. The pump assembly includes an air tube having an axial air passageway; an inlet device positioned along the air tube, the inlet having a tubular inlet body having an internal air passageway aligned with the air tube and having at least one inlet opening extending through the inlet body for admitting air into the tubular inlet body. The inlet device further includes an air filtering sleeve at least partially surrounding the inlet opening of the inlet device, the sleeve having a tubular sleeve body at least partially surrounding and in co-axial relationship the tubular inlet body. The pump assembly further includes an outlet device positioned in-line along the air tube, the outlet device having a tubular outlet body and an axial passageway in-line with the air tube and having at least one outlet passage tube from the outlet device through the carcass wall to the tire cavity.

14 Claims, 10 Drawing Sheets

IN-LINE PUMPING ASSEMBLY FOR SELF-INFLATING TIRE

FIELD OF THE INVENTION

The invention relates generally to self-inflating tires and, more specifically, to a pumping assembly for a self-inflating tire.

BACKGROUND OF THE INVENTION

Normal air diffusion reduces tire pressure over time. The natural state of tires is under inflated. Accordingly, drivers must repeatedly act to maintain tire pressures or they will see reduced fuel economy, tire life and reduced vehicle braking and handling performance. Tire Pressure Monitoring Systems have been proposed to warn drivers when tire pressure is significantly low. Such systems, however, remain dependant upon the driver taking remedial action when warned to re-inflate a tire to recommended pressure. It is a desirable, therefore, to incorporate a self-inflating feature within a tire that will self-inflate the tire in order to compensate for any reduction in tire pressure over time without the need for driver intervention.

SUMMARY OF THE INVENTION

In one aspect of the invention, a tire for a self-inflating tire system includes a tire carcass having an annular air tube-receiving groove formed within a tire carcass wall and a pump assembly within the groove. The pump assembly includes an air tube having an axial air passageway; an inlet device positioned along the air tube, the inlet having a tubular inlet body having an internal air passageway aligned with the air tube and having at least one inlet opening extending through the inlet body for admitting air into the tubular inlet body. The inlet device further includes an air filtering sleeve at least partially surrounding the inlet opening of the inlet device, the sleeve having a tubular sleeve body at least partially surrounding and in co-axial relationship the tubular inlet body.

In another aspect, the tubular sleeve is composed of a cellular air filtration material and includes exterior protrusions for engaging the tire carcass wall to retain the inlet device within the air tube-receiving groove.

In a further aspect, the tubular inlet body includes a plurality of inlet openings extending through the inlet body in a spaced apart circumferential pattern and first and second tubular coupling members connected to opposite ends of the tubular inlet body, and each coupling member having an end coupling to a respective air tube end.

The pump assembly further includes in another aspect an outlet device positioned along the air tube, the outlet device having a tubular outlet body and an axial passageway in-line with the air tube and having at least one outlet passage tube from the outlet device through the carcass wall to the tire cavity.

DEFINITIONS

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Groove" means an elongated void area in a tire wall that may extend circumferentially or laterally about the tire wall. The "groove width" is equal to its average width over its length. A grooves is sized to accommodate an air tube as described.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which.

DETAILED DESCRIPTION OF THE INVENTION

Referring to FIGS. 1, 2, and 3, 6A, 7,8A, and 8B, a tire assembly 10 includes a tire 12, a peristaltic pump assembly 14, and a tire rim 16. The tire mounts in conventional fashion to a pair of rim mounting surfaces 18 adjacent outer rim flanges 20. The rim flanges 20 have radially outward facing surface 22. The tire 12 is of conventional construction, having a pair of sidewalls 24 extending from opposite bead areas 26 to a crown or tire tread region 28. The tire and rim enclose a tire cavity 30. The tire carcass is reinforced by one or more ply layers 32 that wrap around a bead core 34 in the bead area 26. The carcass plies 32 form a turnup 36 having a radially outward end above the bead core 34.

Referring to FIGS. 1, 7A, 8A, and 8B, an annular groove 38 is positioned within the tire carcass 12 in a high flex region in order to effect operation of a peristaltic pump assembly as will be explained. The positioning of groove 38 is preferably within a sidewall 24 in the bead region 26 at a radial location above the upper end of rim flange 20, radially above the bead core 34, and radially above the ply turnup ends 36. Such a position provides the requisite flexing properties to actuate the peristaltic pump while avoiding contact between the pumping mechanism and the rim. Such a position also avoids the ply turnup ends.

Figure 8A:
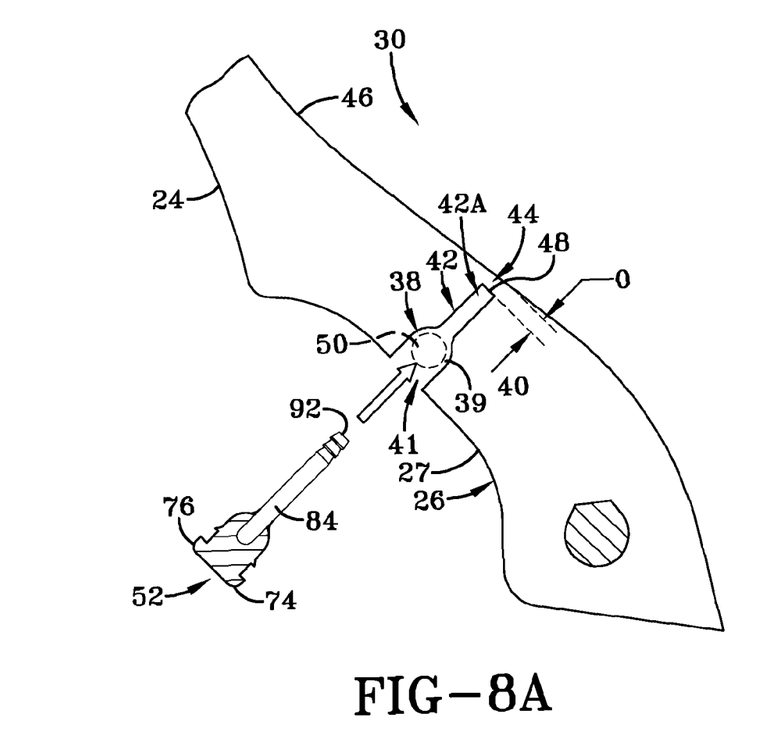
FIG. 8A is an exploded schematic view showing insertion of the outlet device through a tire.
Figure 8B:
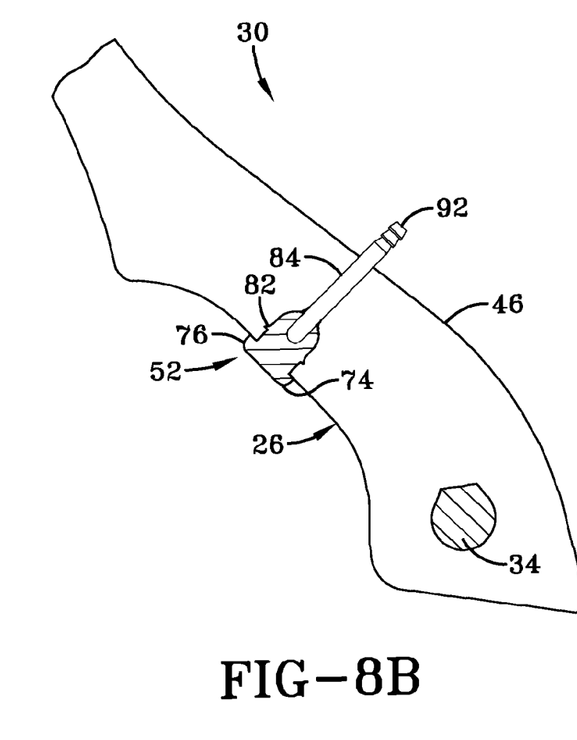
FIG. 8B is a schematic view showing the completed insertion of the outlet device.

The groove 38 is generally U-shaped an is profiled in section to include an access opening 41 opening to a sidewall outward side; a primary groove chamber 39 of generally circular cross-section sized and shaped to closely receive a peristaltic pump tube as will be explained; and an expansion chamber 40 surrounding the primary groove chamber. The expansion chamber 40 generally creates a space adjacent to the primary groove chamber 39 within which the peristaltic pump tube can expand as it is progressively flattened by flexing of a rolling tire. The expansion chamber 40 lies in part axially inward from the primary groove chamber 39 as shown by FIGS. 8A and 8B. The groove 38 circumscribes the tire carcass at a high flex location and is molded into the tire during tire construction, preferably.

At an outlet device-receiving location along the groove 38, the groove is molded to have a cross-sectional profile to accommodate receipt of an outlet device as will be explained. At the outlet device-receiving location along the groove, the groove is molded to further include a tire cavity-directed passageway 42 extending axially inward from the expansion chamber 40 partially toward tire cavity 30. The passageway 42 is configured to provide a pair of parallel spaced apart cylindrical passageway segments 42A, 42B (only 42A shown in FIG. 8A and FIG. 8B). The passageway segments 42A, 42B, groove chambers 39, 40 are molded within the tire sidewall at a desired outlet device-receiving location within the groove 38 during tire construction.

As molded, the passageway segments 42A, 42B represent pilot pathways and extend axially inward from the expansion chamber 40 partially to the tire cavity 30 of the tire carcass 12. The passageway segments extend into sidewall a distance that separates terminal ends 48 of the segments axially from the tire cavity 30 by a barrier wall 44 having a reduced sectional thickness "D" relative to the carcass wall into which the groove 38 is molded. The thickness of barrier wall 44 is approximately forty percent of the thickness of the carcass wall with the passageway segments 42A and 42B extending approximately sixty percent through the carcass wall. The barrier wall 44 of the sidewall lies between the terminal ends 48 of the segments 42A, 42B and the inner liner 46 in the post-constructed tire carcass at a specific outlet device receiving location along the groove 38. The barrier wall 44 is of like composition as the tire sidewall and, being of rubber composition, the reduced section barrier wall 44 is readily penetrable and removable from the tire carcass in a post-construction procedure. Once the barrier wall 44 is removed from the tire carcass, the passageway segments 42A, 42B represent through-passages open from the chamber 40 axially inward to the tire cavity 30.

As seen from FIGS. 1,3, 4A through 4D, 5A through 5C, 8A, and 8B, the peristaltic pump assembly 14 includes an annular air tube 50 that encloses an annular passageway. The tube 50 is formed of a resilient, flexible material such as plastic or a rubber compound that is capable of withstanding repeated deformation cycles wherein the tube is deformed into a flattened condition subject to external force and, upon removal of such force, returns to an original condition generally circular in cross-section. The tube is of a diameter sufficient to operatively pass a volume of air sufficient for the purpose of self-inflating the tire 12 during tire operation. The tube 50 and the groove 38 are compatibly sized and configured such that the tube 50 inserts through the access opening 41 and closely resides within the primary groove chamber 39. The tube 50 within the groove 38 are placed in a high flex region of the tire carcass 12 as described previously.

The peristaltic pump assembly 14 further includes an inlet device 54 and an outlet device 52 spaced apart approximately 180 degrees within the circumference of annular air tube 50. Situated at an outlet location is an outlet device 52 having an elongate body 73 in which L-shaped outlet tubes 84, 86 extend and exit. The body 73 is preferably of molded plastic construction and provides retention flanges 74, 76 at opposite upper sides, a retention groove 78 along opposite elongate sides beneath flanges 74, 76, and a cylindrical lower body portion 80. A pair of barb ridges 82 are placed at each end of the body 73 adjacent to the body grooves. Outlet tubes 84, 86 are preferably formed of plastic or stainless steel material and have axial through passageways extending end to end. The tubes 84, 86 are housed within opposite ends of the outlet device body 73. So situated, the L-shaped tubes 84, 86 and the axial passageways therein extend from intake ends 88, 90 to exhaust ends 92, 94. The tube ends 88, 90 are diametrically dimensioned to couple to ends of the annular air tube 50 while ends 92, 94 extend and direct air into the tire cavity 30. Retention ribs 95 may be formed in some or all of the tube ends 88, 90, 92, and 94 to assist in coupling the ends 88, 90 with the annular air tube 50 and ends 92, 94 with devices or apparatus such as a pressure regulating valve/device within the tire cavity 30 (not shown). The tubes 84 provide conduits for the passage of air from the annular tube 50 into the tire cavity 30 (directional arrow 96) and air from the cavity back into and out of the tube 50 (directional arrow 98) if necessary or desired.

Figure 1:
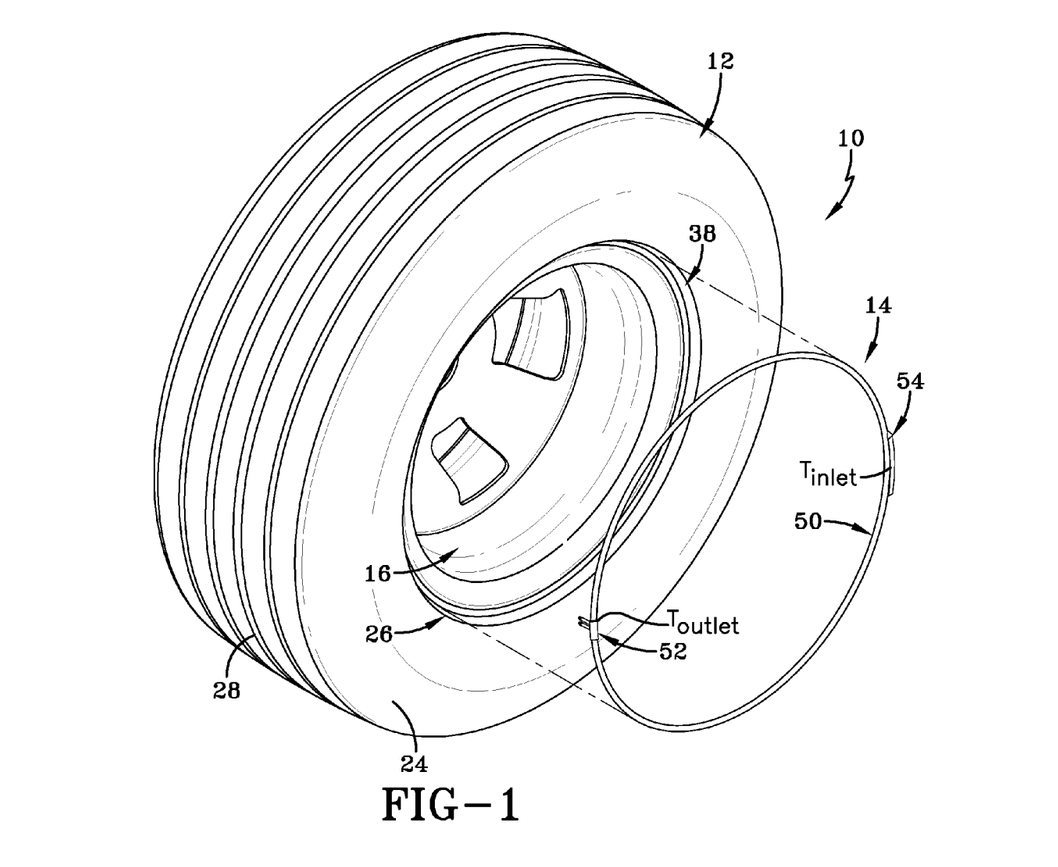
FIG. 1 is an exploded isometric view of a tire, rim, and peristaltic tube assembly.
Figure 2:
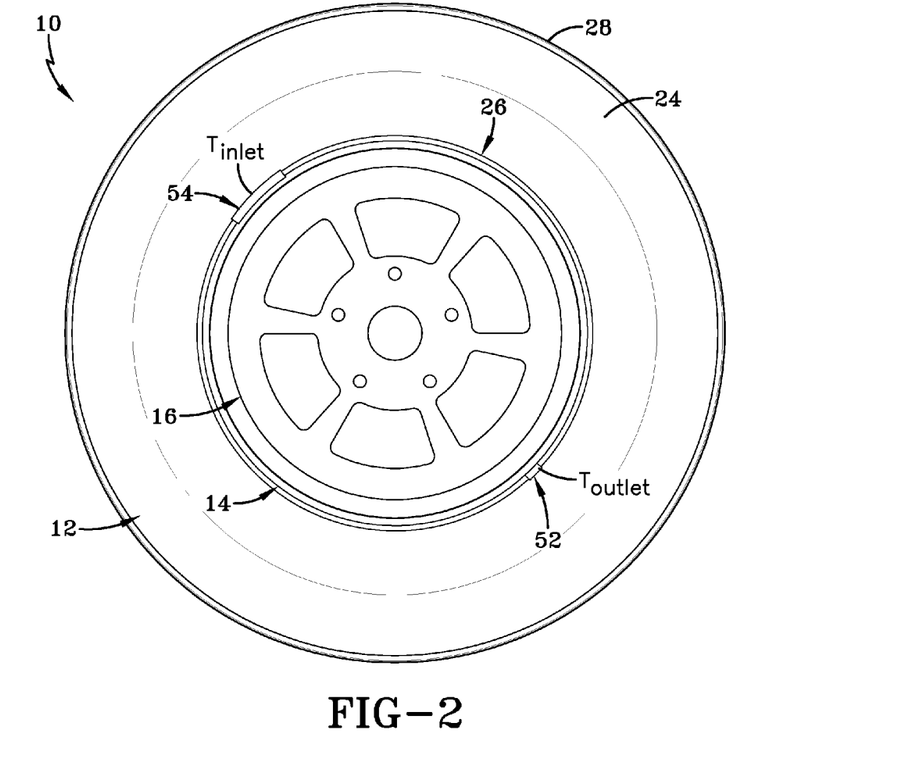
FIG. 2 is a side view of the tire with the peristaltic tube assembly within a tire sidewall.

As shown by FIGS. 1, 3, and 4A through 4D, the inlet device 54 is connected to the tube 50 at an inlet location opposite to the outlet device 52. The inlet device 54 has a cylindrical tube body 56 and an array of through perforations or openings 58 extending through the body 56 to allow ambient air into an axial passageway through the body 56 (FIGS. 4A through 4D). Surrounding the mid-portion of the tube body 56 is a filter sleeve 60 formed of porous cellular material of a density allowing air to pass through but blocking undesired particulates. The sleeve 60 is formed having a pair of outwardly extending lobe protrusions 62, 64; a pair of channels 65 adjacent to respective lobe protrusions; and a pair of barb detent ridges 66 on opposite sides of the sleeve that define with the lobe protrusions 62, 64 the channels 65. The sleeve positioned around the body 56 filters input air flow in direction 61 passing through the sleeve and through perforations 58 into the body 56. The tube body 56 has opposite ends 68, 70 that project outward free of the sleeve 60. The ends 68, 70 may be provided with externally formed detent barbs or ridges to facilitate attachment of the ends to free ends of the annular air tube 50. The diameter of the tube body 56 is generally equivalent to that of the air tube 50 such that both may fit in-line within the annular groove 38 formed within the tire sidewall. Moreover, a bored sleeve body portion 67 surrounding the tube body is formed of a cellular or foam filtering material such that the portion 67 may be compressed to an extent necessary to force fit with the tube body 56 into the tire groove 38. The detent barb ridges 66 engage the sides of the tire groove 38 upon insertion to mechanically affix the inlet device into the tire groove. Additional means of attachment such as adhesive may be employed to fix the inlet device 54 into the groove 38 if desired. FIG. 2 illustrates the peristaltic tube assembly 14, including inlet device 54 and outlet device 52 attached to the tube 50, installed into the groove 38 of the tire carcass.

The inlet filter sleeve 67 is preferably constructed of a material such as a porous membrane that passes air and blocks fluids from entering into the tube body 56 and there from the pump tube 50. A suitable material, without limiting the invention, is polytetraflouroethylene (PTFE). The filter sleeve 67 is thus self-cleaning and capable of high volume air flow into the tube body 56. The sleeve 67 further provides mechanical protection to the body 56 and is positioned in-line with the tubes 56 and 50. The inlet device 54 may be assembled as a single assembly with fittings at the inlet ends 68, 70 for attachment to the tube 50. Minimization of components and a higher reliability results.

As shown in FIGS. 8A and 8B, and FIGS. 5A through 5C, the outlet device 52 connects to the air tube 50 opposite to the inlet device 54. Ends 88, 90 of the outlet device 52 and ends 68, 70 of the inlet device 54 couple to ends of the air tube 50 to form the assembly 14 of FIGS. 1 and 3. The inlet device ends and outlet device ends have generally the same diametric dimensions as the tube 50 to facilitate the coupling. The assembly 14 is thereafter assembled to a tire 12 in a post-cure operation. The tire 12 is formed as described above having molded groove 38, including chambers 39, 40 and partial passageways 42A, 42B at an outlet device location along the annular groove 38. The assembly 14 is aligned with the groove 38 of the tire 12, with the outlet device 52 opposite the outlet device location of the groove 38. Thereafter, the tube 50, inlet device 54, and outlet device 52 are press inserted into the groove 38. The inlet device cellular sleeve 60 is compressed to facilitate press insertion. In the fully inserted position, the tube 50 resides in the primary groove chamber 39 of the groove 38, and the inlet and outlet devices reside at respective inlet and outlet device locations along the groove 38. The profiled configuration of the inlet device 54 captures edges defining the groove 38 within the channel 65 as barb ridges 66 and the lobe projections 62, 64 capture the groove edges therebetween. The configuration of the outlet device 52, as shown in FIGS. 8A, 8B, similarly captures edges defining the groove 38 between ridges 82 and the retention flanges 74, 76.

It will be noted that attachment of the assembly 14 to the tire 12 occurs after the molded barrier wall 44 is removed from the tire in a post-manufacture and cure boring procedure. Once the barrier wall 44 is removed, the legs 84, 86 of the device 52 can project through the primary groove chamber 39, the adjacent expansion chamber 40, and through the dual parallel passageways 42A, 42B to reach the tire cavity 30. Once fully inserted, the passageway from the tube 50 communicates through the passageways of the outlet tubes 84, 86 with the tire cavity 30. The ends 90, 92 of the tubes 84, 86 may be coupled to a pressure regulator mechanism (not shown) within the tire cavity that opens to allow air flow into the cavity (direction 96) when the cavity pressure falls below a preset level or out of the cavity (direction 98) should the pressure exceed a recommended level.

Figure 7A:
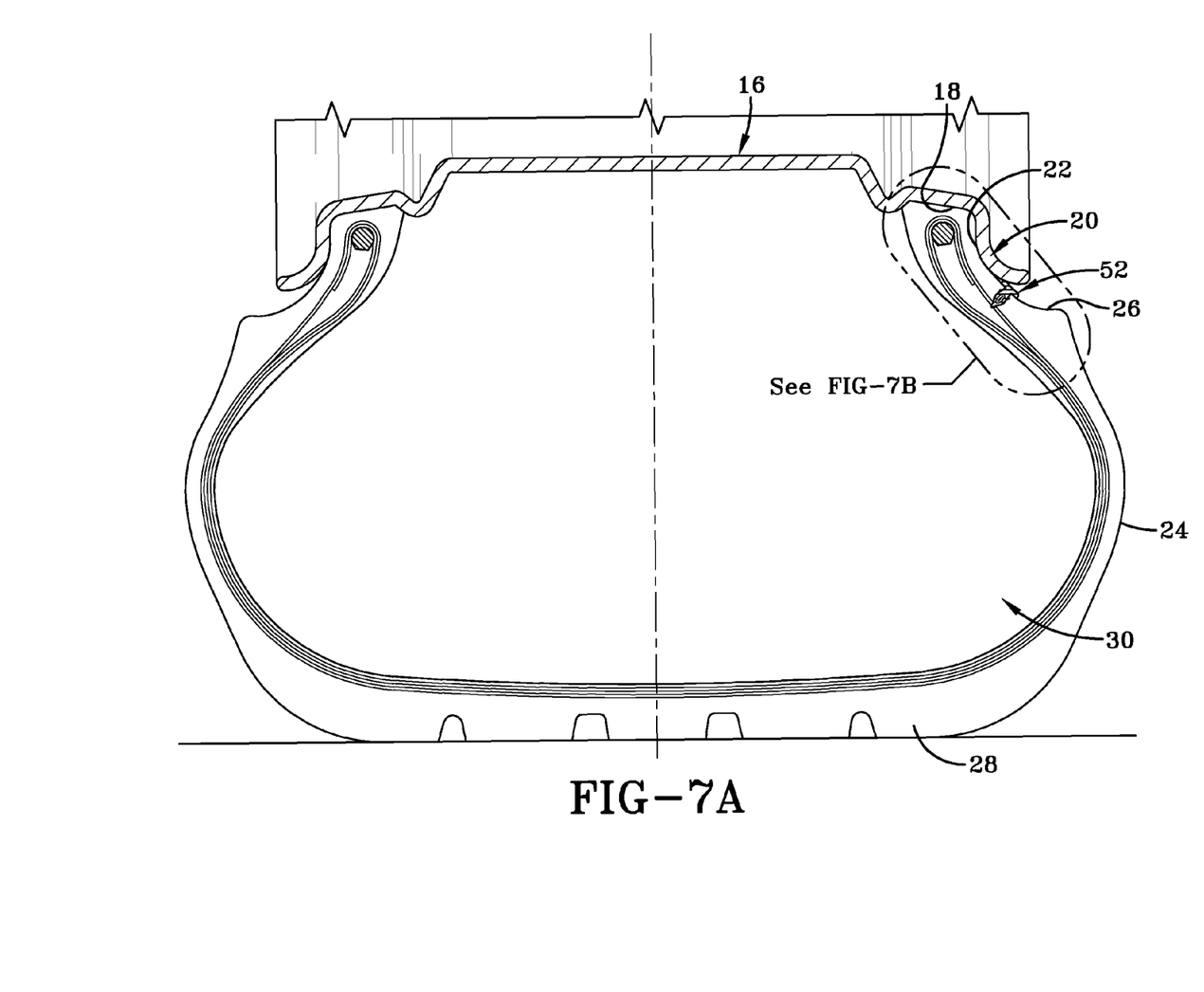
FIG. 7A is a cross sectional view through a tire and rim assembly showing placement of the outlet device.
Figure 7B:
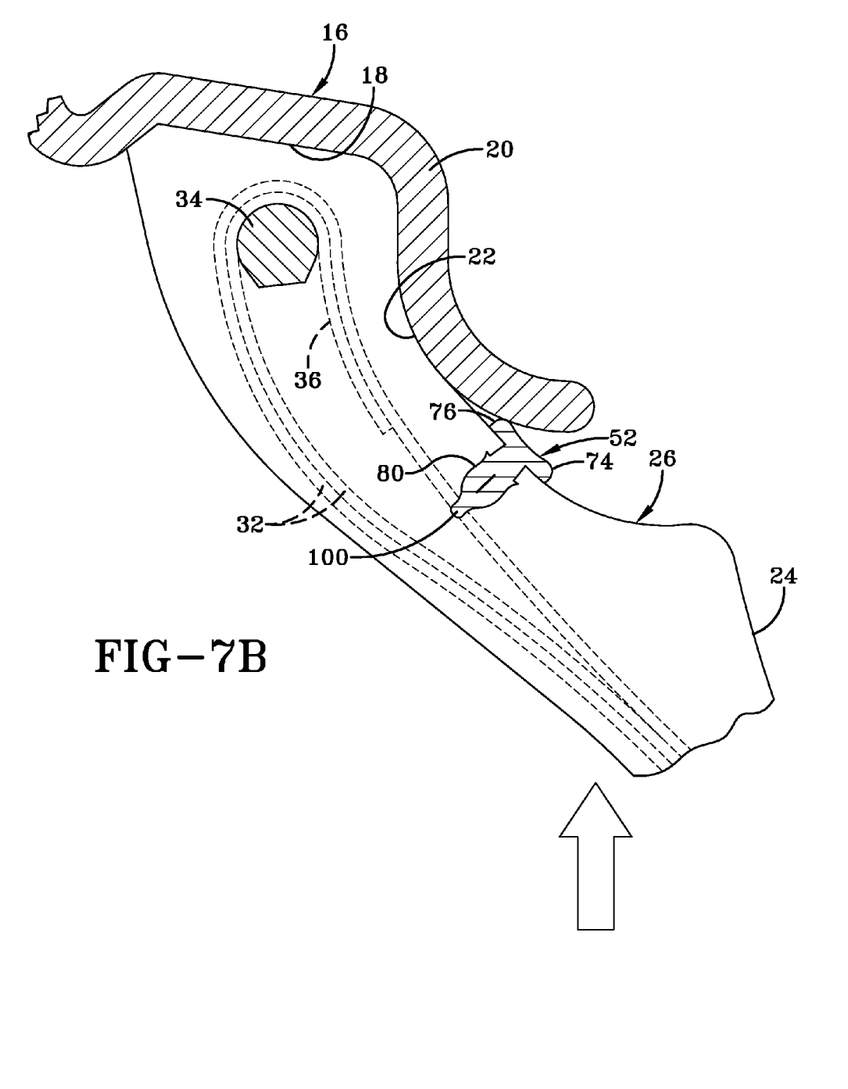
FIG. 7B is an enlarged view of region 7B of FIG. 7A.

As will be appreciated from FIG. 2, the inlet device 54 and the outlet device 52 are positioned within the circular air tube 50 generally 180 degrees apart. The tire rotates in an operational mode, causing a footprint to be formed against a tire-contacting ground surface. A compressive force as shown in FIG. 7A is directed into the tire from the footprint and acts to flatten the air tube 50 segment by segment as the tire rotates. Extended portions 100 of the air tube 50 caused by the segment by segment flattening of the tube are accommodated by the groove expansion chamber 40 as shown in FIG. 7A. FIG. 7A shows an expansion portions 100 of the tube moving into the expansion chamber 40 of the groove 50. Flattening of the tube 50 segment by segment draws ambient air into the air tube 50 through the inlet device 54, filtered by sleeve 60, and forces air along tube passageway toward and into the outlet device 52. From the outlet device, air is forced through the outlet tubes 84, 86 through the tire sidewall and into the tire cavity 30. A peristaltic pump of the subject type is disclosed and described in co-pending U.S. patent application Ser. No. 12/643,176 filed on Dec. 21, 2009, incorporated herein by reference.

The post-cure assembly of the pump assembly 14 to the tire 12 are after the groove 38 (including primary chamber 38), tube expansion chamber 40, and partial passages 42A, 42B are molded in. The advantages attended the procedure is that such assembly requires that minimal or no ply cords be cut. Moreover, the integrity of the tube 50 and devices 52, 54 may better be ensured. A uniform tube 50 shape, location and passage integrity is thus achieved and no change or diminishment of plant capacity utilized in tire construction results. The expansion chamber 40 is molded in with the groove 38. The passage segments 42A and 42B are at the same radial location as the pump tube 50 in the tire 12. The passage segments 42A, 42B are opened to the tire cavity 30 by removal of the barrier wall 44 of the tire sidewall through drilling or punching by use of an awl or other apparatus. The passageways 42A, 42B are molded in as deep as possible as pilot pathways so as not to puncture a press shaping bladder during the tire build. It is preferred that the barrier wall 44 be dimensioned having a sectional thickness within a range of 35 to 45 percent the thickness of the carcass wall.

It should be noted that the partial passageways 42A and 42B may be molded in or drilled. The process for manufacturing the tire and peristaltic pump assembly is as follows.

The green tire carcass 12 is built by conventional means having the tire cavity 30 defined by the tire inner liner 46, first and second sidewalls 24 extending respectively from first and second tire bead regions 26 to the tire tread region 28;

The air tube-receiving groove 38 is molded into the green tire carcass within the green tire carcass wall at a prescribed radial location such as in bead region wall 27. The groove 38 is molded in an annular configuration in a single form including the access opening 41, primary internal groove chamber 39 and the secondary expansion groove chamber 40 adjacent to and communicating with the internal groove chamber 39. The expansion groove chamber 40 operationally receives a flattened air-pump tube extended portion.

The groove 38 provides the partial pilot passageway(s) 42A, 42B located at a prescribed groove outlet location along the air tube-receiving groove 38. The partial passageway(s) 42A, 42B extend from the groove chamber 40 partially through the tire carcass wall 27 toward the tire cavity and has an axially inward terminal end(s) 92,94 separated from the tire inner liner by a removable tire carcass barrier 44 of reduced sectional thickness relative to the tire carcass wall 27.

The green tire carcass is cured to form a cured tire carcass; and the tire carcass barrier 44 is removed in a post-cure operation to create a through-bore from the groove 38 to the tire cavity 30 at the outlet device-receiving location of the groove 38. Separately, the pump assembly 14 is assembled to include the air tube 50; the inlet device 54 positioned along the air tube and having an inlet opening(s) 58 for admitting air into the air tube 50; and the outlet device 52 positioned along the air tube opposite the inlet device 54.

The wall barrier 44 is removed by drilling or punching. The outlet passage tubes 84, 86 are plugged at ends 92, 94 to prevent entry of contaminants. A sealant is introduced within the groove 38. The pump assembly 14 is inserted into the tube-receiving groove 38 with the outlet device 52 registered within the groove at the prescribed outlet-receiving location of the groove. The outlet passage tubes 84,86 extend from the outlet device through the through-bore created by removal of barrier 44 and to the tire cavity 30.

The sealant within the groove 38 is allowed to cure. Should a secondary sealant or covering layer be desired, the tire and assembly 14 may be mounted over a rim and the tire inflated. A secondary covering may then be applied over the pump assembly 14 and allowed to cure. The tire is then deflated and removed from the rim.

The plugs may then be removed from the outlet passage tubes 84, 86 and a pressure regulating check valve assembly attached to the ends 92, 94 of the outlet device. The check valve assembly (not shown) operates to regulate air flow into and out of the cavity 30 based on a preset desired cavity inflation pressure. Such a regulator is of a type available from regulator suppliers such as Emerson/ASCO Pneumatics located in Novi, Mich.; EATON Corporation located in Southfield, Mich.; and Parker Corporation located in Otsego, Mich.

Figure 3:
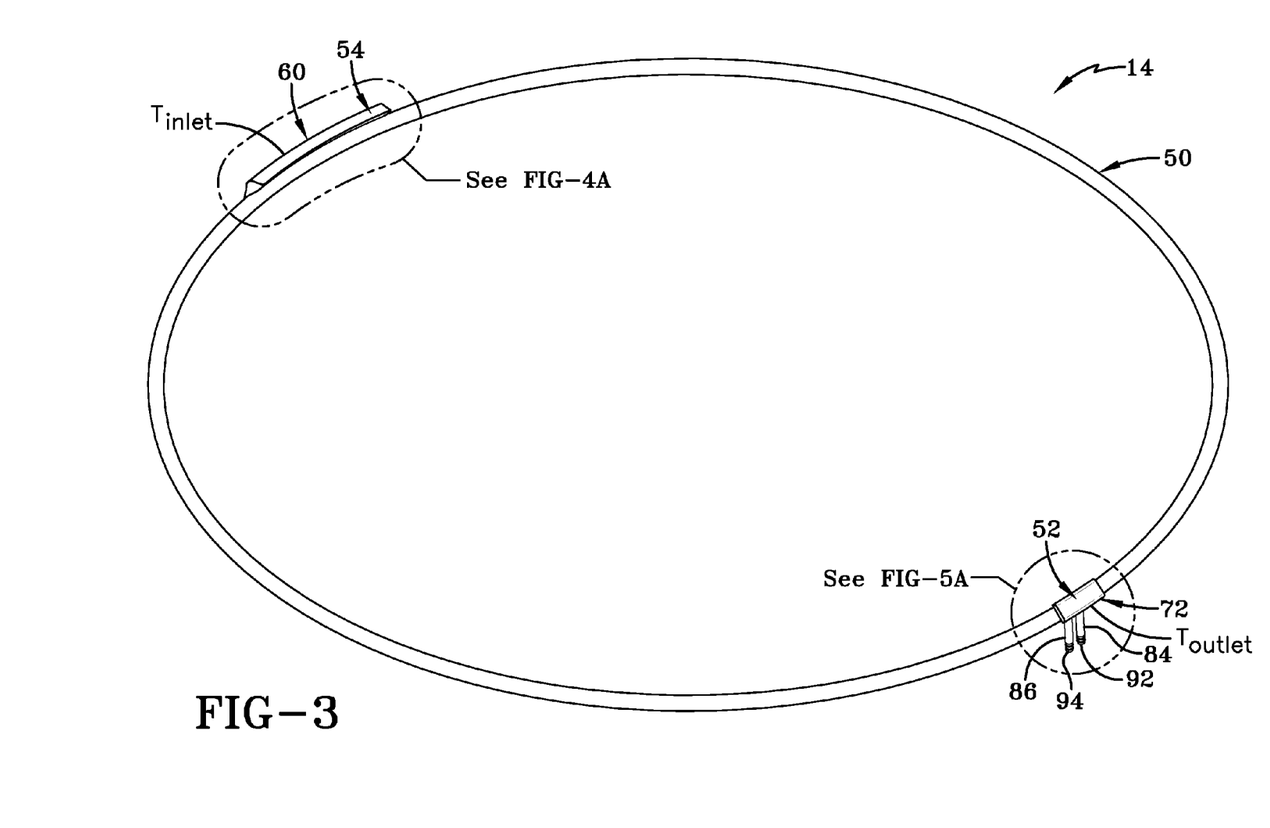
FIG. 3 is an enlarged perspective view of the peristaltic tube assembly.
Figure 4A:
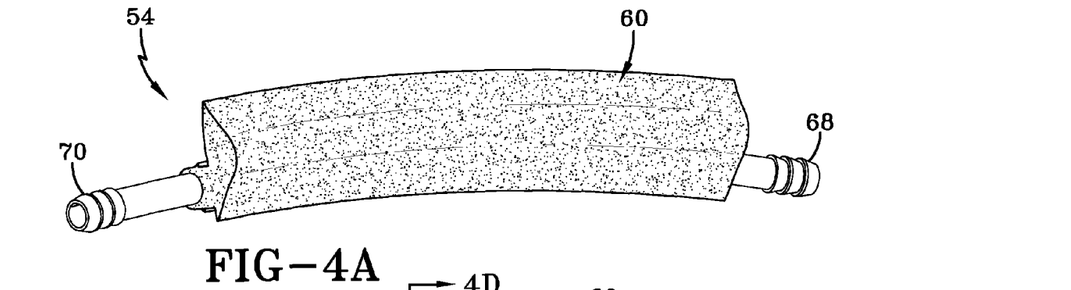
FIG. 4A is a perspective view of an inlet device component of the tube assembly.
Figure 4B:
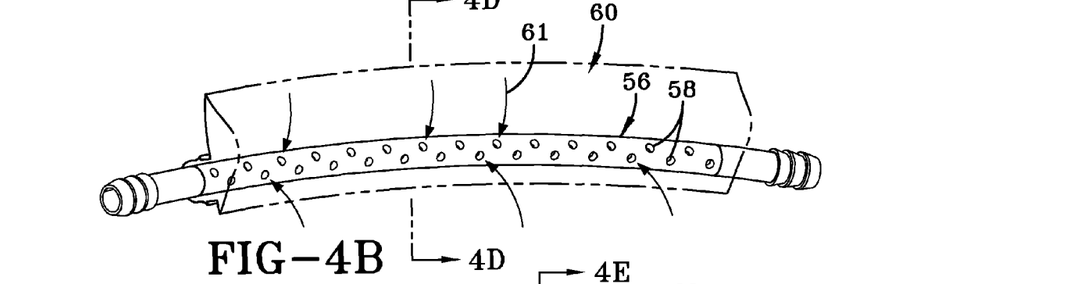
FIG. 4B is a perspective view partially in phantom of the inlet device component showing internal tube location and configuration.
Figure 4C:
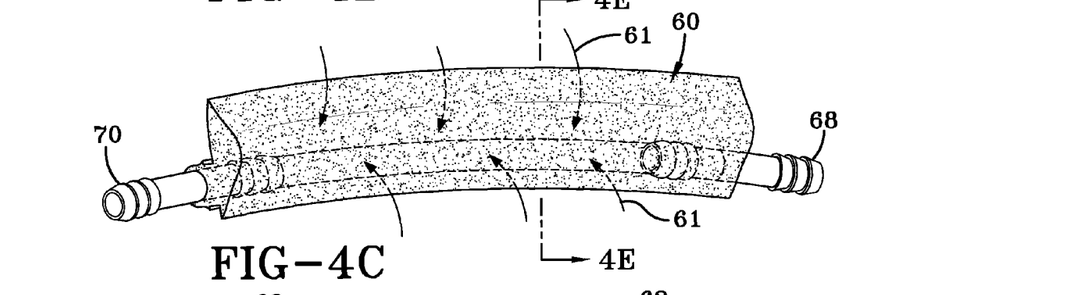
FIG. 4C is a cross-sectional view through the inlet device component showing in phantom the inlet device tubular body.
Figure 4D:
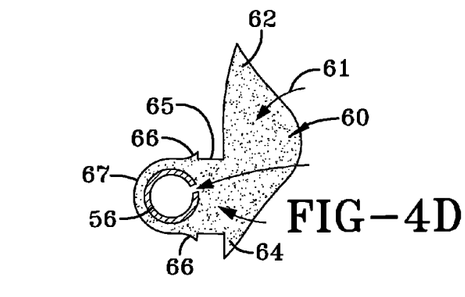
FIG. 4D is a sectional view of FIG. 4B taken along the line 4D-4D.
Figure 4E:
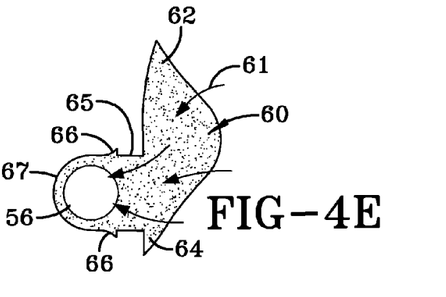
FIG. 4E is a sectional view of FIG. 4C taken along the line 4E-4E.
Figure 5A:
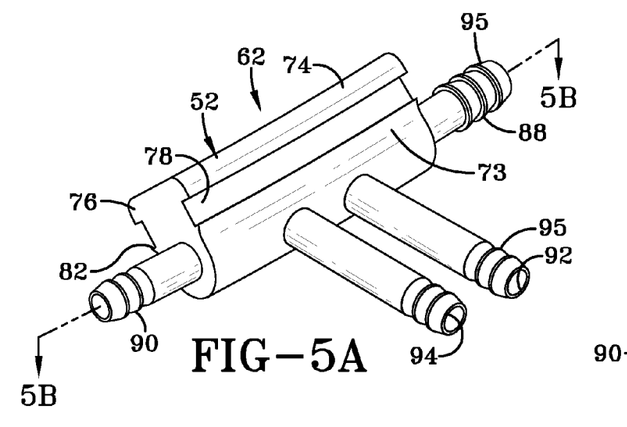
FIG. 5A is a perspective view of an outlet device component of the tube assembly.
Figure 5B:
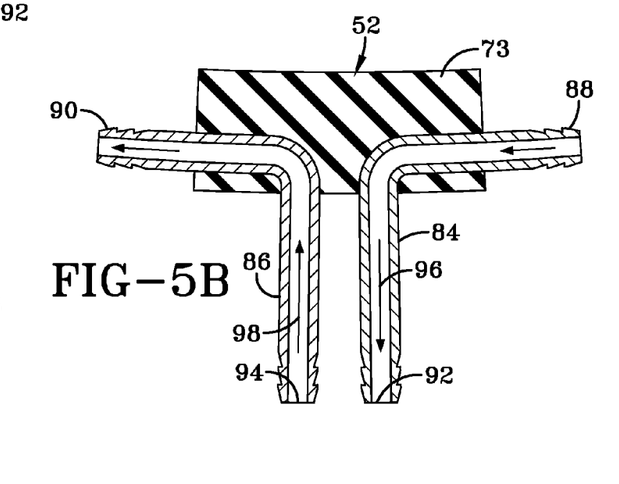
FIG. 5B is a sectional view of the outlet device taken along the line 5B-5B of FIG. 5A.
Figure 5C:
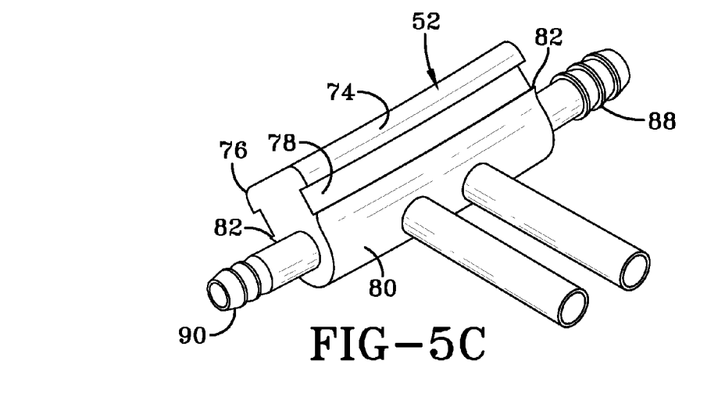
FIG. 5C is an alternative configuration of the outlet device.
Figure 6A:
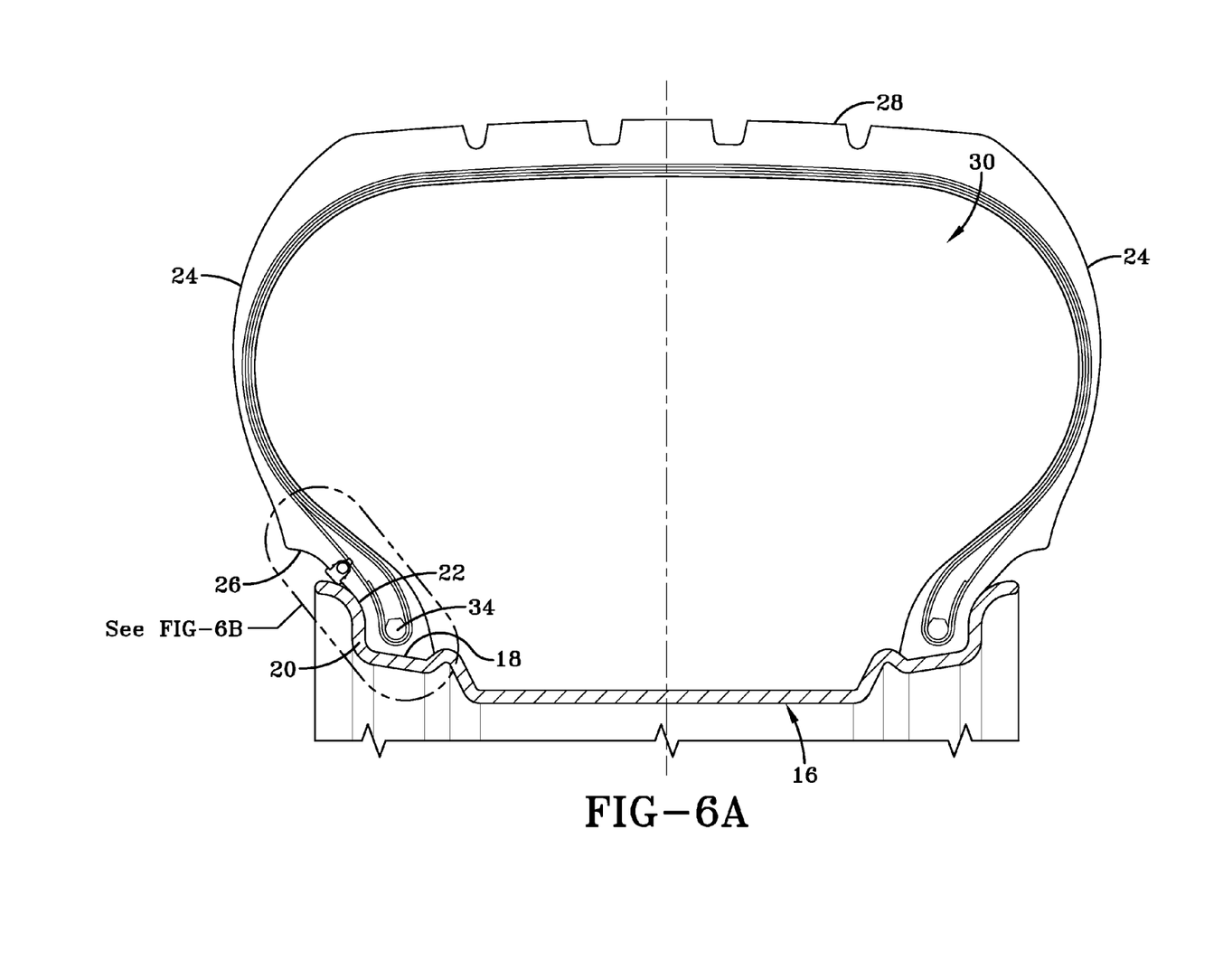
FIG. 6A is a sectional view through the tire, rim and tube assembly.
Figure 6B:
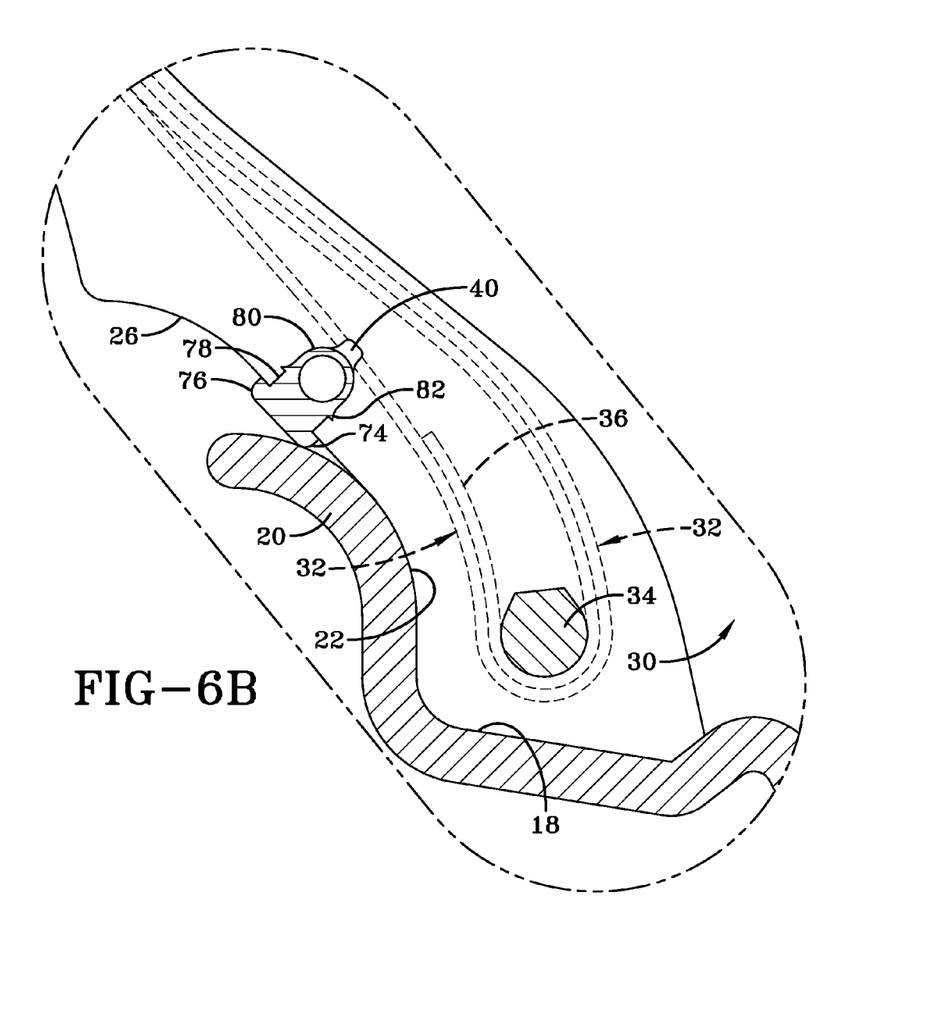
FIG. 6B is an enlarged sectional view of the identified region of FIG. 6 and showing the location of the tube assembly within the tire.

It will be further appreciated that the pump assembly 14 is constructed in an in-line configuration of components 50, 52, and 54. Such a configuration enhances the efficiency of air intake through the inlet device 54 into tube 50, along the tube 50 and into the outlet device 52. Structural obstruction to the flow of air is avoided and the overall in-line annular assembly as shown in FIG. 3, lacking any interfering protrusions and structural obstructions, is relatively easy to insert into groove 38. Moreover, the housings of the inlet device 54 and outlet device 52 in the form of filtering sleeve 60 and body 73 include retention ridges to engage and retain the devices 52, 54 within groove 38 at desired respective inlet and outlet device-receiving locations. It will further be noted that the sleeve 60 fulfills the multifaceted functionality of serving as an inlet air filter, a covering to the inlet openings 58 that protect the openings from external originating contaminants, and a retention mechanism for holding the inlet device 54 within the groove 38. Likewise, the outlet device 52 positioned along the air tube 50 is in-line, the outlet device providing tubular outlet body 73 and an axial passageway in-line with the air tube. The body 73 houses the L-shaped tubes 84, 86, and acts to retain the outlet device 52 within groove 38. The passageways 42A, 42B are closed in an as molded configuration but become open to the tire cavity with the removal of barrier 44. Accordingly, the passageways remain clear of contaminants until opened by the removal of barrier 44 to receive the tubes 84, 86 in a post-cure assembly procedure.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A tire for a self-inflating tire system comprising:
a tire carcass having a tire cavity defined by a tire inner liner, first and second sidewalls extending respectively from first and second tire bead regions to a tire tread region;
an annular air tube-receiving groove formed within a tire carcass wall at a prescribed radial location;
a pump assembly comprising an air tube having an axial air passageway positioned within the air tube-receiving groove; an inlet device positioned along the air tube, the inlet device having a tubular inlet body having an internal air passageway aligned in-line with the air tube, the tubular inlet body having at least one inlet opening extending through the inlet body for admitting air into the tubular inlet body; and the inlet device having an air filtering tubular sleeve at least partially surrounding and encasing the tubular inlet body and covering over the inlet opening of the inlet device, the filtering sleeve extending along in co-axial relationship with the tubular inlet body.

2. The tire of claim 1, wherein the tubular sleeve is composed of a cellular air filtration material.

3. The tire of claim 2, wherein the tubular sleeve comprises exterior protrusion means for engaging the tire carcass wall for retaining the inlet device within the air tube-receiving groove.

4. The tire of claim 3, wherein the tubular inlet body comprises a plurality of inlet openings extending through the inlet body in a spaced apart circumferential pattern.

5. The tire of claim 4, wherein the inlet device comprises first and second tubular coupling members connected to opposite respective ends of the tubular inlet body and each coupling member has an outward end coupled to a respective air tube end.

6. The tire of claim 1, wherein the pump assembly further comprises an outlet device positioned along the air tube, the outlet device having a tubular outlet body and an axial passageway aligned in-line with the air tube and having at least one outlet passage tube from the outlet device through the carcass wall to the tire cavity.

7. The tire of claim 6, wherein the outlet device is positioned substantially opposite the inlet device within the air tube-receiving groove.

8. The tire of claim 7, wherein the outlet body comprises exterior protrusion means for engaging the tire carcass wall for retaining the outlet device within the air tube-receiving groove.

9. The tire of claim 8, wherein the at least one outlet passage tube extends axially inward from the outlet device through the tire carcass wall.

10. The tire of claim 9, wherein the air tube-receiving groove is positioned within a lower portion of the tire carcass proximate a carcass tire bead region.

11. The tire of claim 10, wherein the tubular sleeve is composed of a cellular air filtration material.

12. The tire of claim 11, wherein the tubular sleeve comprises exterior protrusion means for engaging the tire carcass wall for retaining the inlet device within the air tube-receiving groove.

13. The tire of claim 12, wherein the tubular inlet body comprises a plurality of inlet openings extending through the inlet body in a spaced apart circumferential pattern.

14. The tire of claim 13, wherein the inlet device comprises first and second tubular coupling members connected to opposite respective ends of the tubular inlet body and each coupling member has an outward end coupled to a respective air tube end.

* * * * *